US007606655B2

(12) United States Patent
Husted et al.

(10) Patent No.: US 7,606,655 B2
(45) Date of Patent: Oct. 20, 2009

(54) CYLINDER-PRESSURE-BASED ELECTRONIC ENGINE CONTROLLER AND METHOD

(75) Inventors: Harry L. Husted, Luxembourg (LU); Clinton W. Erickson, Russiaville, IN (US); Ashish D Punater, Carmel, IN (US); Karl A. Schten, Kokomo, IN (US); Gerald A Kilgour, Kokomo, IN (US); Michael P. Conyers, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 227 days.

(21) Appl. No.: 11/895,748

(22) Filed: Aug. 27, 2007

(65) Prior Publication Data

US 2008/0082250 A1 Apr. 3, 2008

Related U.S. Application Data

(60) Provisional application No. 60/848,290, filed on Sep. 29, 2006.

(51) Int. Cl.
*G06F 19/00* (2006.01)
*G01M 15/00* (2006.01)

(52) U.S. Cl. ...................... 701/111; 701/102; 701/115; 73/114.16

(58) Field of Classification Search ......... 701/101–103, 701/110, 111, 114, 115; 123/406.22, 435, 123/436; 73/35.12, 35.13, 114.16–114.23
See application file for complete search history.

(56) References Cited

U.S. PATENT DOCUMENTS

| | | | | |
|---|---|---|---|---|
| 5,276,625 | A * | 1/1994 | Nakaniwa | 701/111 |
| 5,623,412 | A * | 4/1997 | Masson et al. | 701/111 |
| 6,675,638 | B2 * | 1/2004 | Pfitz | 73/114.37 |
| 6,854,441 | B2 * | 2/2005 | Vermonet et al. | 123/299 |
| 2008/0133108 | A1 * | 6/2008 | Kojima et al. | 701/102 |

* cited by examiner

*Primary Examiner*—Willis R Wolfe, Jr.
(74) *Attorney, Agent, or Firm*—Jimmy L. Funke

(57) ABSTRACT

An engine data acquisition and control system measures cylinder pressure at a high degree of resolution and then processes it for portions of the combustion cycle of interest for performing combustion calculations. The data are utilized to calculate combustion parameters, and the combustion parameters may be utilized to control the engine's fuel and/or spark timing/duration, and other variables affecting the combustion process. The system architecture provides for acquisition of very large amounts of data without unduly loading the CPU.

34 Claims, 8 Drawing Sheets

CYLINDER-PRESSURE-BASED ELECTRONIC ENGINE CONTROLLER AND METHOD

CROSS-REFERENCE TO RELATED APPLICATION

This application claims the benefit of U.S. Provisional Patent Application No. 60/848,290, filed on Sep. 29, 2006, the entire contents of which are incorporated herein by reference.

TECHNICAL FIELD

The present invention is related to control of internal combustion engines utilizing cylinder pressure measurements.

BACKGROUND OF THE INVENTION

The cylinder pressures of an internal combustion engine can be measured and utilized to determine key information about the engine's operation. Cylinder pressure measurements can be utilized to calculate combustion parameters such as Indicated Mean Effective Pressure (IMEP), Start of Combustion (SOC), total Heat Release (HRTOT), the crankshaft angles at which 50% and 90% of the total heat release have occurred (HR50, HR90), and the crankshaft angle Location of Peak Pressure (LPP).

High resolution cylinder pressure readings provide for more accurate combustion parameter calculations. However, if cylinder pressure readings are taken at very short time intervals/small crank rotation angular increments, a very large volume of data is generated. Because the various combustion parameters need to be calculated from the raw pressure data, a very large volume of cylinder pressure data may exceed the computing capability of controllers utilized for control of internal combustion engines. The inability to quickly process large amounts of data utilizing an "on-board" controller typically precludes use of high resolution data for closed-loop engine control.

SUMMARY OF THE INVENTION

The present invention interfaces to multiple cylinder pressure sensors located at each cylinder of an internal combustion engine to evaluate cylinder combustion events. Sensor outputs are converted to angle based cylinder pressure samples via high speed analog to digital (A/D) converters. An angular position sensing element such as an encoder connected to a rotating engine component provides an angular reference of the position of the moving engine components (i.e. angular position within the 720° engine cycle). The crank angle information from the angular position sensing element is utilized to trigger the A/D converters and thereby sample pressure data from the cylinder pressure sensors in the angle domain. Crank angle information may be used to synthesize high angle resolutions from a lower resolution angular position sensing element (e.g. encoder) and thereby sample the cylinder pressure sensors at high angular sample rates. The conversion results from each A/D converter are transferred to a microcontroller via four Serial Peripheral Interface (SPI) ports, and Direct Memory Access (DMA) features within the microcontroller transfer the conversion results to pre-defined memory buffers without Central Processing Unit (CPU) intervention, thus saving computing capacity for use in doing other calculations.

Because the cylinder pressure data measured during the combustion event is of primary importance for determining combustion parameters, higher resolutions of angle based samples are required. Cylinder pressure data from other portions of the engine cycle are less critical to making the combustion parameter calculations and therefore can utilize samples at lower angle based resolutions. The present invention provides for user-defined "windows" corresponding to different portions of an engine cycle to allow variable angle based sample rates of cylinder pressure data during one engine cycle. Different angular resolutions for cylinder pressure data can be specified in each of the windows. This allows data samples of maximum resolution in portions of the engine cycle where combustion occurs and less resolution in less critical portions of the engine cycle, thereby substantially reducing the amount of data utilized for combustion parameter calculations.

Data from a particular cylinder can be processed during the portions of the cycle following a combustion event, and utilized to control parameters such as the volume and timing of fuel supplied to the cylinder, timing of the spark, and the like in the very next engine cycle of that cylinder. The present invention provides a way to accurately measure the cylinder pressure at very small crank angles during the combustion event, and the various combustion parameters needed for control can be calculated and utilized for control of the cylinder in the very next engine cycle. In this way, the combustion occurring in each cylinder can be very closely monitored and utilized for real-time control of the engine.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 1:
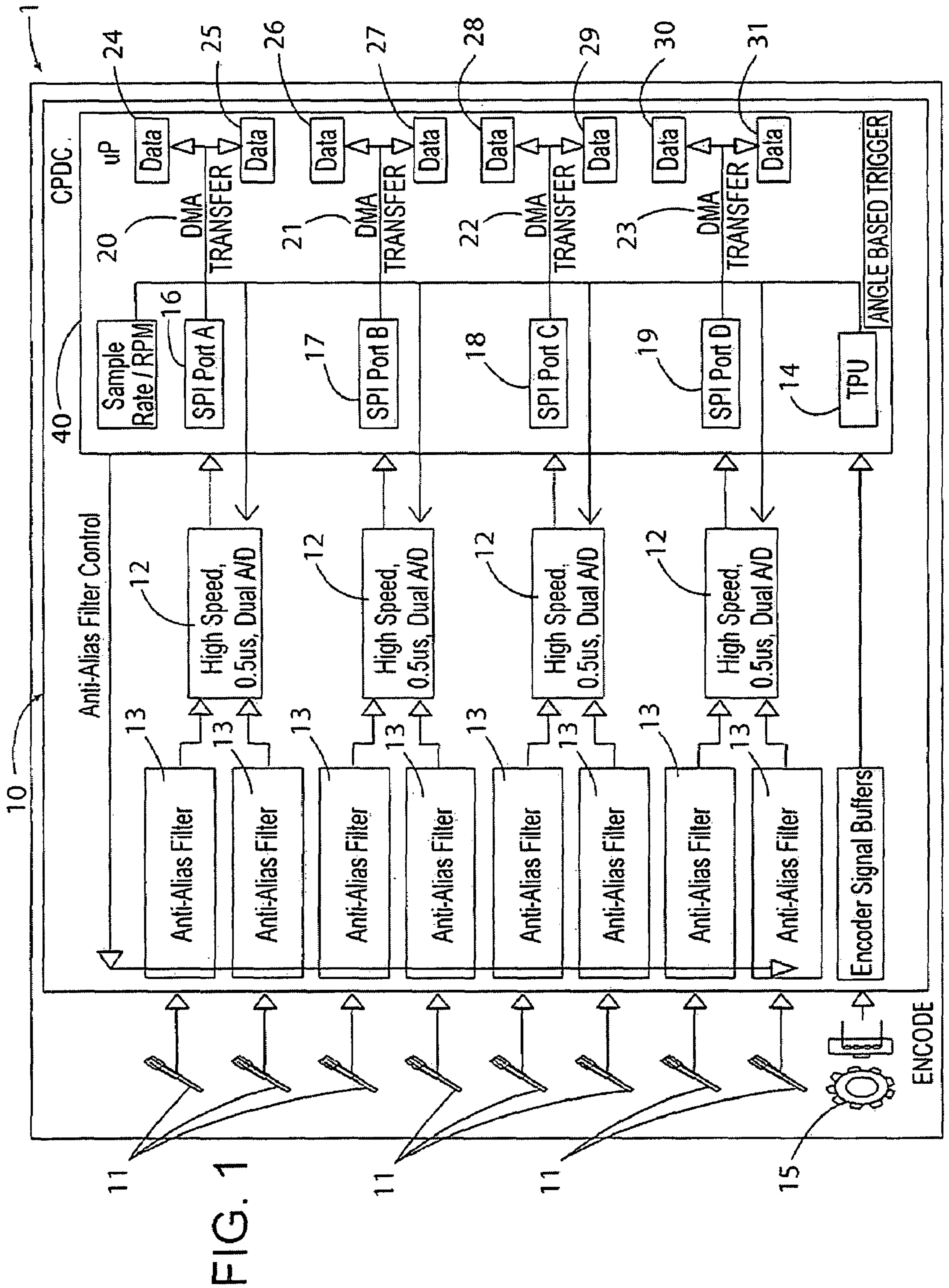
FIG. 1 is a schematic view of the internal combustion cylinder pressure sensors located in an 8-cylinder engine and data acquisition system located within the invention according to one aspect of the present invention.

For purposes of description herein, the terms "upper," "flower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

With reference to FIG. 1, a control system 1 includes a Cylinder Pressure Development Controller (CPDC) 10 having a plurality of cylinder pressure measurement channels that are operably connected to one or more analog to digital (A/D) converters 12. The data from the individual cylinder pressure sensors 11 passes through anti-alias filters 13 before A/D conversion. All of the A/D converters 12 share a common engine angle-based trigger signal generated from the microcontroller's CPU-independent Time Processor Unit (TPU) 14. The TPU 14 determines the engine angle from either an instrumentation encoder or a typical production-style missing tooth wheel encoder. User-defined sample resolutions down to at least 0.1° are obtained by interpolation/extrapolation of the encoder input to synthesize the angle-based A/D trigger signal at higher resolutions than the crank shaft sensor data provided by encoder 15. Other resolutions such as 0.2°, 0.5° and 1.0° degrees may also be utilized. The conversion results from each A/D converter 12 are transferred to the microcontroller 40 by four Serial Peripheral Interface (SPI) ports 16-19. Direct Memory Access (DMA) features within microcontroller 40 transfer the conversion results from the A/D converters 12 to pre-defined memory buffers 24-31 without CPU intervention. The length of each buffer 24-31 allows for multiple engine cycles of sample data retention. It will be understood that memory buffers 24-31 may be internal or external. Thus, the buffers 24-31 could comprise one or more separate memory chips, or they could comprise memory internal to the microcontroller 40. This allows the system to continuously perform simultaneous angle-based sampling of all cylinder pressure sensors every 0.1° of engine revolution at 6000 rpm. The individual data buffers 24-31 can be utilized for instrumentation (such as data logging) or for cylinder combustion parameter calculations by the CPU. Although a plurality of individual A/D converters 12 are shown, it will be understood that an integrated circuit having a single A/D converter with multiple sample and hold inputs could also be utilized.

Figure 2:
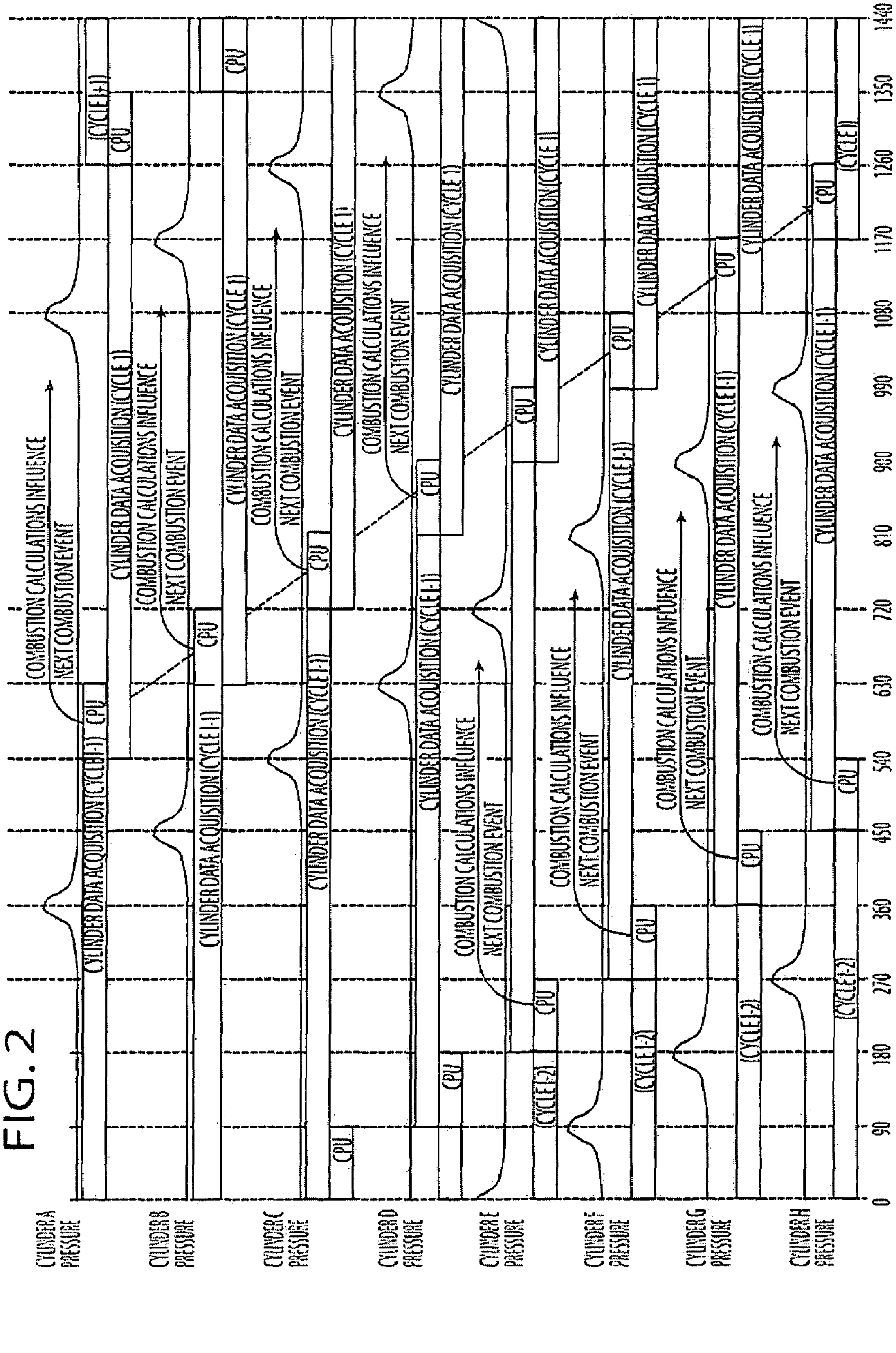
FIG. 2 is a graph showing the sequence of data acquisition, calculation, and control for each cylinder during the cycles of an eight cylinder engine.

This arrangement allows cylinder pressure combustion calculations to occur while data is continually acquired in the background with minimal CPU intervention. Cylinder pressure combustion calculations occur sequentially for each cylinder during each engine cycle while data is continually acquired in the background. In the illustrated example, combustion calculations are performed every 90°, corresponding to 720 degrees for a four-stroke combustion cycle divided by the number of cylinders in the engine. For engines with a different number of cylinders or a different combustion cycle (e.g., two-stroke or six-stroke), this calculation interval would be adjusted accordingly. In the example shown in FIG. 2, cylinder A (where cylinders A-H are typically assigned based on physical engine cylinder firing order) combustion calculations are performed in the 540-630° window. Cylinder B calculations take place in the next 90° (630-720°), cylinder C from 720-810°, etc. Each cylinder's combustion calculations are made based on the previous cylinder pressure data for that cylinder. A cylinder's combustion calculation results are then available to provide feedback for control of the next combustion event for that cylinder. For example, at an engine speed of 4500 rpm, the CPU has 3.3 ms to complete cylinder combustion calculations, control algorithms, and any background tasks. The combustion calculations may include Indicated Mean Effective Pressure (IMEP), Start of Combustion (SOC), Heat Release (HRTOT), Heat Release angles such as the 50% Heat Release Angle (HR50) and/or the 90% Heat Release Angle (HR90), and Location of Peak Pressure (LPP). It will be understood that other combustion-related parameters of interest may also be calculated utilizing the cylinder pressure data.

An angle-based sample resolution of 0.1 results in 7200 data points per cylinder (57.6 K data samples for 8 cylinders) for one engine cycle. To reduce the time required in performing calculations on the large number of data samples per engine cycle, a technique to minimize the high CPU throughput that would otherwise be associated with processing such large quantities of data is needed. The present invention integrates a set of user-defined cylinder pressure data windows, each with configurable start angle, angle duration, and angle spacing parameters that perform decimation of data samples to reduce CPU throughput needed to convert the data samples from raw values to accurately scaled cylinder pressure data. In this scheme, the pressure sensors are still sampled at a high rate, e.g. 0.1 degrees between samples, and these samples are all stored to memory. The decimation performs a reduction of the number of data points that are "processed" by selecting only certain points of interest within the total set of samples.

An alternative to decimating the already-acquired data is to selectively sample and store cylinder pressure data only at the angular resolutions identified in the user-defined data windows by triggering the A/D converters 12 at the desired angular frequencies within the data windows. This alternate implementation reduces the number of stored data points to only those retained for use in combustion parameter calculations.

Figure 3:
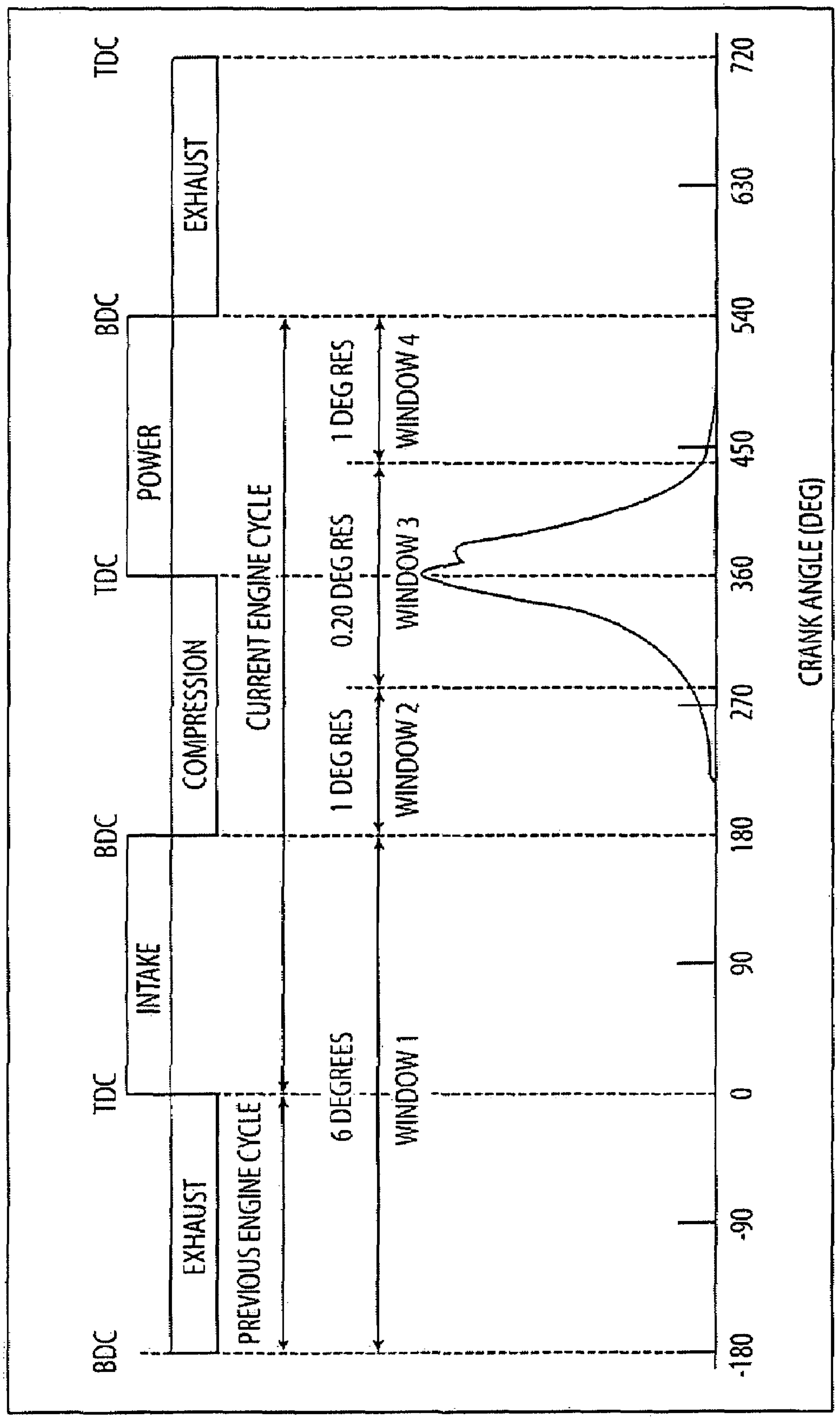
FIG. 3 is a graph showing one example of data measurement windows during a 720° engine cycle.

A typical application would define the windows such that high resolution cylinder pressure data is utilized for combustion calculations around the combustion event and lower resolution data outside the combustion event. An example of one possible definition of the windows is shown in FIG. 3. In the example of FIG. 3, four windows of different durations and resolutions are defined. The first window extends from −180° to 180°, and the data is sampled at 6° of resolution in the first window. A second window extends from 181° to 285°, and the data is sampled at 1° resolution in window 2. In the illustrated example, window 3 extends from 285° to 450°, with data sampled at 0.20° in this window. Finally, window 4 extends from 441° to 540°, and the data is sampled at 1° of resolution in window 4. In this way, high resolution data samples around the peak of combustion event and progressively lower resolution data samples for other portions of the engine cycle are used to calculate the combustion parameters. The number of windows and the size and angular positions of the windows can be set as needed for a particular application. Also, the angular resolutions of the windows can also be set as needed for a particular application.

Figure 4:
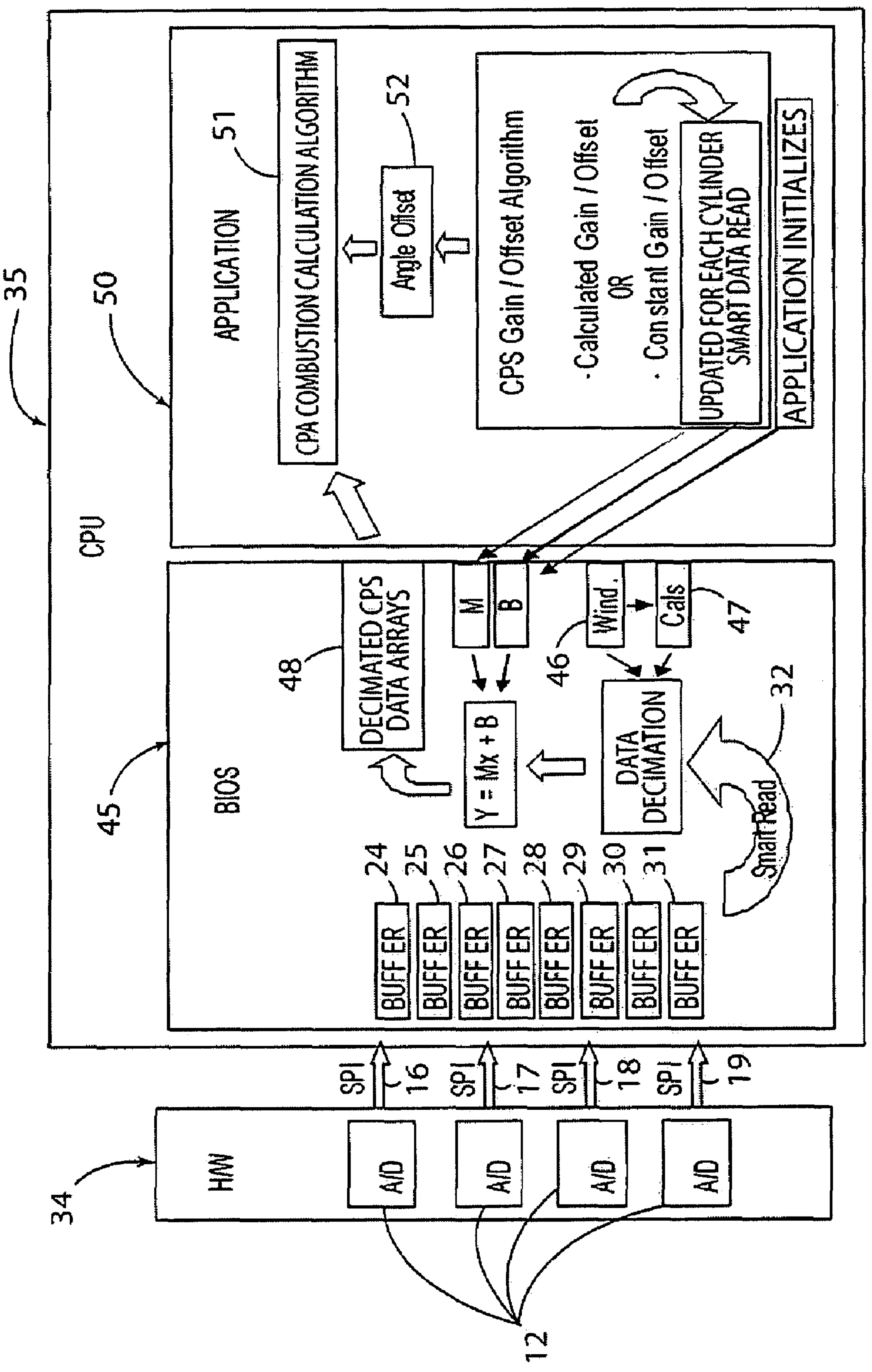
FIG. 4 is a schematic view of a portion of a measurement/control system according to the present invention.

With further reference to FIG. 4, decimation of the data is accomplished by execution of a Smart Data Read Routine 32 by the CPU. The Smart Data Read Routine decimates and aligns the data samples to the crank angle according to the window limits previously defined by the user. Individual cylinder pressure sensor offset and gain calibrations are also applied to the decimated samples on a cylinder-specific basis to convert sensor voltages to cylinder pressure.

FIG. 4 illustrates the CPDC A/D and data transmission hardware 34 and application to BIOS interface software resident within the CPU 35.

The BIOS software 45 calculates cylinder pressure according to the formula:

$$Y=Mx+B \qquad \text{(Equation 1.00)}$$

where, Y represents the cylinder pressure, M represents the gain and B represents offset. The offset B for the sensors compensates for the reading (i.e. voltage level) generated by the sensor at 0 pressure, and the gain M converts the numerical voltage to a cylinder pressure. As illustrated in FIG. 4, the application software 50 may update the offset B and gain M from an initial value set by the BIOS software as required for a particular application. The application software may utilize either a calculated gain/offset or a constant gain/offset. As also shown in FIG. 4, the BIOS software 45 includes window boundaries 46 and calibration data 47. The BIOS software is configured to permit a range of user-defined data windows for collecting data at a specified resolution over a specified angular rotation of the crank shaft. The window "block" 46 shown in FIG. 4 represents the window boundaries as set by the user for a particular application. The calibration data shown schematically as "block" 47 in FIG. 4 represents the number of engine cylinders utilized in a particular application, and other engine-specific parameters that need to be set for a particular application. It will be appreciated that the control system 1 has been described as being used for an 8 cylinder engine. However, it will be readily appreciated that the control system 1 may be utilized for engines having various numbers of cylinders and/or configurations. The BIOS software 45 is configured to be easily set or configured for an engine having a number of cylinders that may be 8 cylinders or fewer cylinders.

The application software 50 receives the decimated CPS data array information 48, and utilizes the data to calculate the various combustion parameters as required for the particular application utilizing an algorithm 51. It will be understood that to accurately calculate the combustion parameters relatively precise position alignment of the high-resolution data provided by the hardware 34 and BIOS software 45 is required. The application software may include an angle offset feature 52 to compensate for encoder alignment errors and signal delays due to the anti-aliasing filters or the cylinder pressure sensor signal conditioning devices. The application software 50 is responsible for performing combustion calculations and subsequent combustion parameter-based control algorithms. The application software 50 is generated from auto-coded model-based algorithms developed using the Matlab Simulink/Stateflow tool chain.

The combustion parameters may be utilized to control various aspects of engine operation. For example, if the engine is a diesel engine, the cetane level or rating of the fuel being used may be determined. This, in turn, may be utilized to control the timing and/or volume of fuel injected into the cylinders. If the engine is a gasoline engine, the combustion parameters may be utilized to detect misfiring and/or detonation ("knocking") during combustion. The spark timing and/or fuel timing and/or volume can be controlled based on this information. The combustion parameters may also be used to manage/control engine noise (especially in diesel engines) and/or balancing of the combustion in the cylinders (gasoline and diesel engines). Still further, the calculated combustion parameters may also be used to control gasoline and/or diesel combustion modes such as Homogeneous Charge Compression Ignition (HCCI), Pre-mixed Charge Compression Ignition (PCCI), and Clean Diesel Combustion (CDC).

Figure 5:
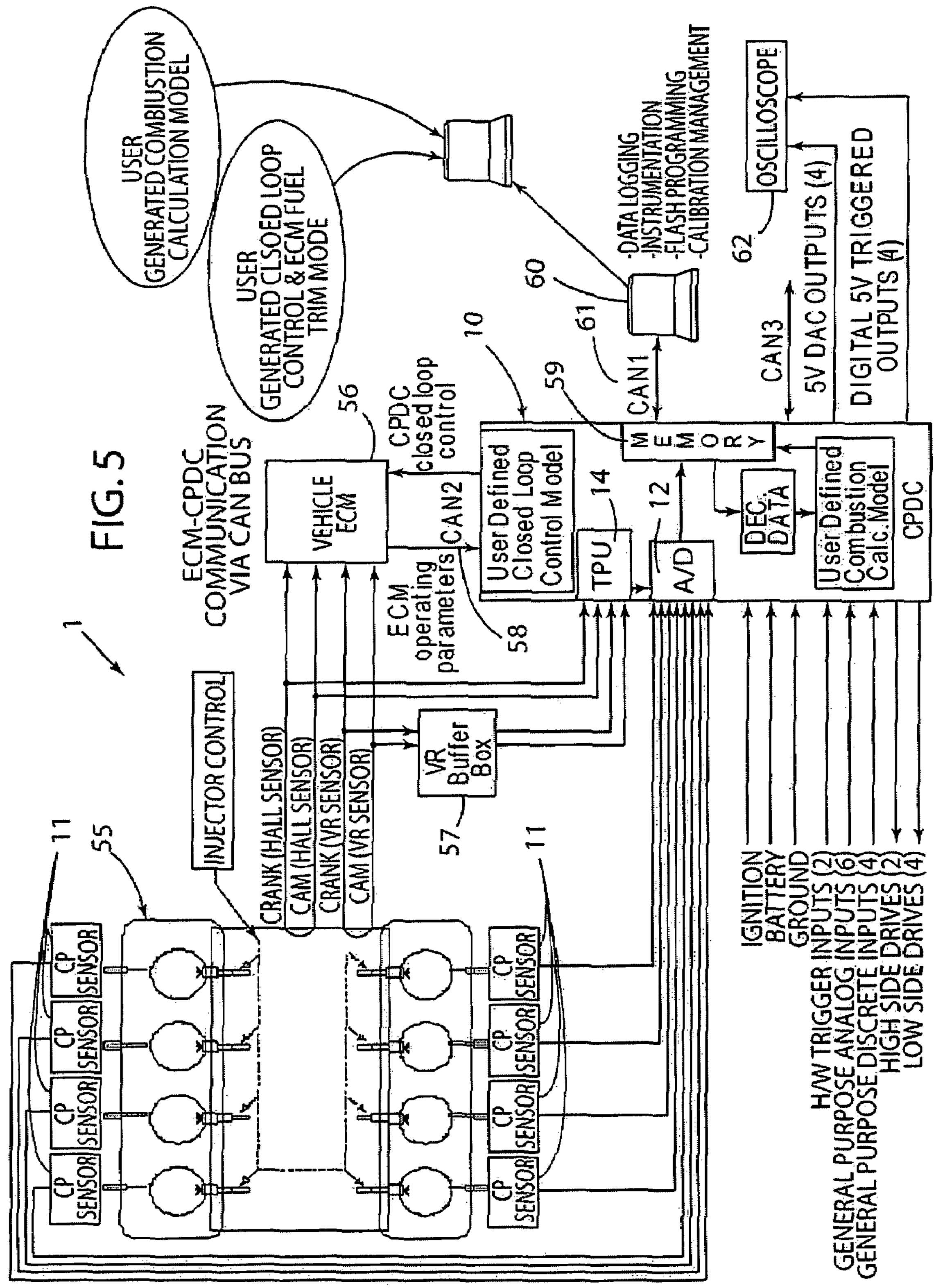
FIG. 5 is a schematic view of an engine control system according to one aspect of the present invention.

With further reference to FIG. 5, a data acquisition and control system 1 according to one aspect of the present invention may be utilized in a developmental or diagnostic-type environment. System 1 includes the vehicle engine control module (ECM) that receives angular position information of the crank and the camshaft of an internal combustion engine 55. The crank and camshaft sensor data may be generated by a Hall sensor or a variable reluctance (VR) sensor. Information from the cylinder pressure sensors 11 is supplied to the analog to digital (A/D) converters 12 of the CPDC 10. The data from the crank and cam sensors is also supplied to the TPU 14 of the CPDC 10. If the crank and cam sensors are VR sensors, a VR buffer box 57 may be utilized. The CPDC 10 is operably connected to the ECM 56 by a high speed Controller Area Network (CAN) bus 58. In the illustrated example, the CAN bus interconnecting the CPDC 10 and the ECM 56 is designated "CAN 2". Algorithms for calculating the combustion parameters are loaded into the CPDC's (flash) memory 59. The combustion parameters calculated by the CDPC 10 may be transmitted to the ECM and/or laptop computer 60 for control, display, or data logging purposes. In the illustrated example, laptop 60 is connected to the memory 59 via a high speed CAN bus 61 that is designated "CAN 1" in FIG. 5. Alternatively, engine control algorithms which use the calculated combustion parameters may be loaded into the CPDC's flash memory 59. Control results can then be serially transmitted to the ECM, other vehicle control modules, or instrumentation. For instrumentation purposes, the CPDC 10 allows data to be output on 4 D/A channels as well as logged in internal memory for later extraction and post processing. PC 60 provides the user interface for data logging control, logged data extraction, instrumentation features, flash programming, and calibration management functions via high speed CAN bus 61. An oscilloscope 62 (or other instrumentation) may be connected to the CPDC 10 so it receives the 5 V DAC outputs and the digital 5 V triggered outputs (4). The CPDC 10 receives input from the vehicle ignition, battery, and ground, and may receive input from the hardware (H/W) trigger inputs, general purpose analog inputs, general purpose discrete inputs as well. The CPDC 10 outputs high and low side drives that may be used to control a variety of external components from the application code.

Although a variety of microprocessors could be utilized to implement the present invention, a Freescale Semiconductor MPC 5554 is one example of a preferred microprocessor.

Figure 6:
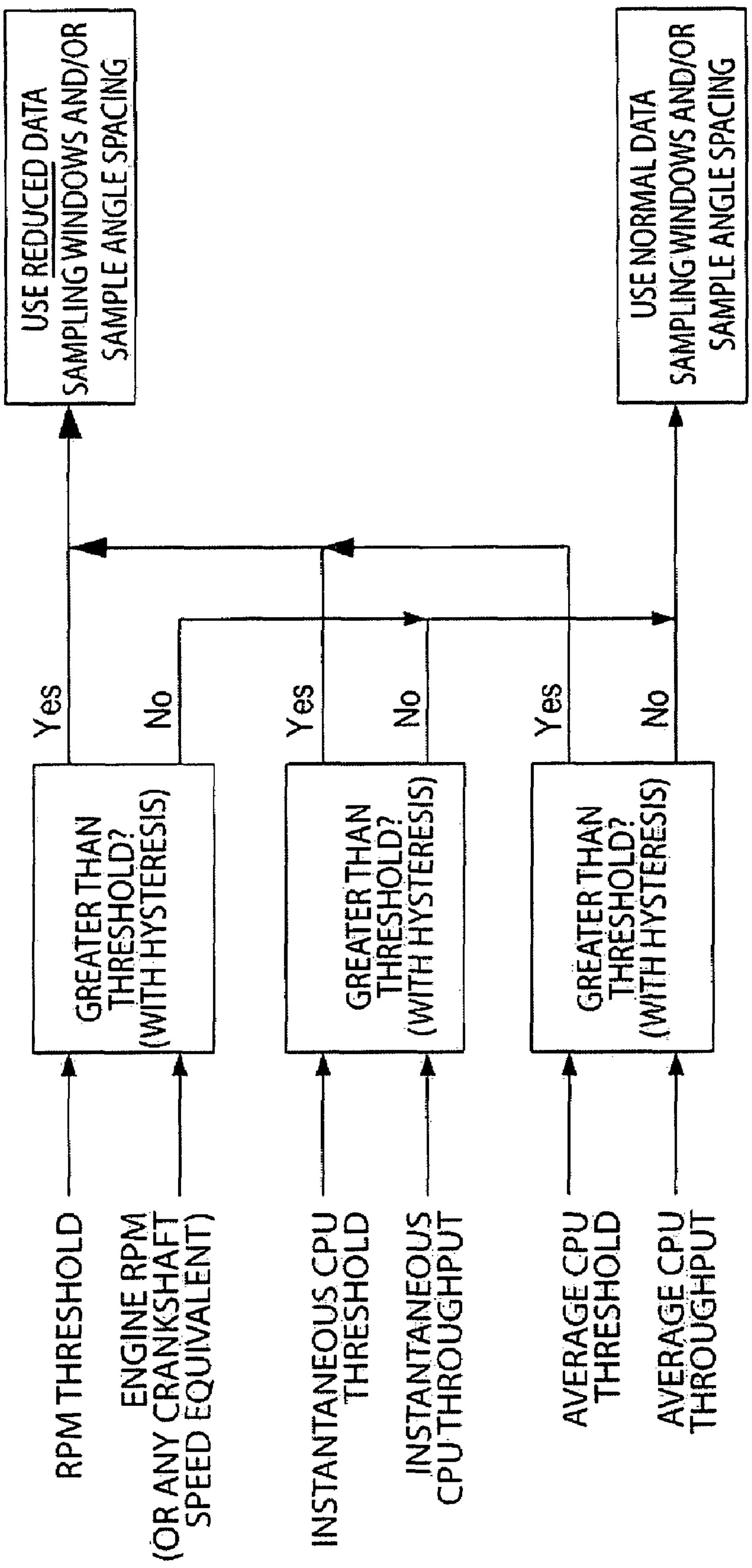
FIG. 6 is a flow diagram of an algorithm that may be used to determine the data sampling mode.
Figure 7:
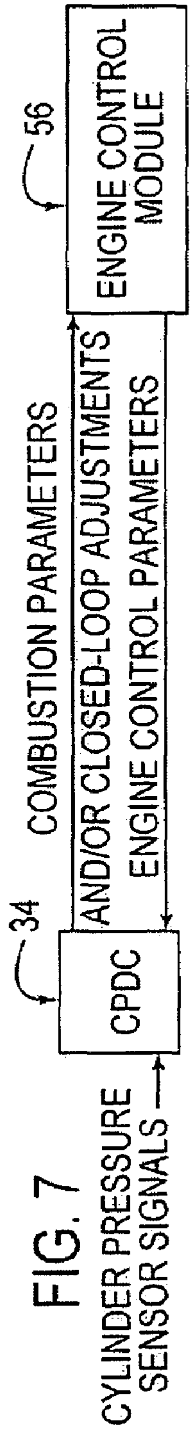
FIG. 7 is a schematic view of an engine control system according to one aspect or embodiment of the present invention.

With further reference to FIG. 6, various operating parameters can be measured and compared to threshold levels to determine if "normal" data sampling windows and/or sample angle spacing may be utilized, or if modified data sampling windows and/or sample angle spacing should be utilized. For example, the engine rpm can be measured and compared to a preselected RPM threshold. If the engine rpm exceeds the rpm threshold, the software will utilize modified data sampling windows and/or sample angle spacing to reduce the data subject to processing. Similarly, the instantaneous CPU throughput can be compared to the instantaneous CPU threshold, and modified data sampling can be utilized if the CPU throughput exceeds the CPU threshold. Similarly, the average CPU throughput can be compared to the threshold for average CPU throughputs, and modified data sampling can be utilized if the threshold is exceeded.

As shown in FIGS. 7-10, the present invention may be implemented in several different ways. In a first embodiment, shown in FIG. 7, the cylinder pressure sensor signals are received by the CPDC hardware 34 which may be either stand-alone hardware, or part of another controller. The CPDC hardware 34 calculates the combustion parameters based upon the cylinder pressure sensor signals, and transmits the results to the ECM 56. It will be understood that the embodiment illustrated in FIG. 7 corresponds to the arrangement illustrated in more detail in FIG. 5. Alternatively, the CPDC 34 may use engine control parameters received from the ECM 56 along with the combustion parameter calculations to compute closed loop adjustments to the engine control parameters. These adjustments are then transmitted to the ECM 56 for improved engine control. Engine control parameters received by the CPDC 34 may include cylinder specific data about fuel injection timing, quantity, spark timing, etc., and general engine parameters such as manifold pressure, intake air flow, and coolant temperature.

Figure 8:
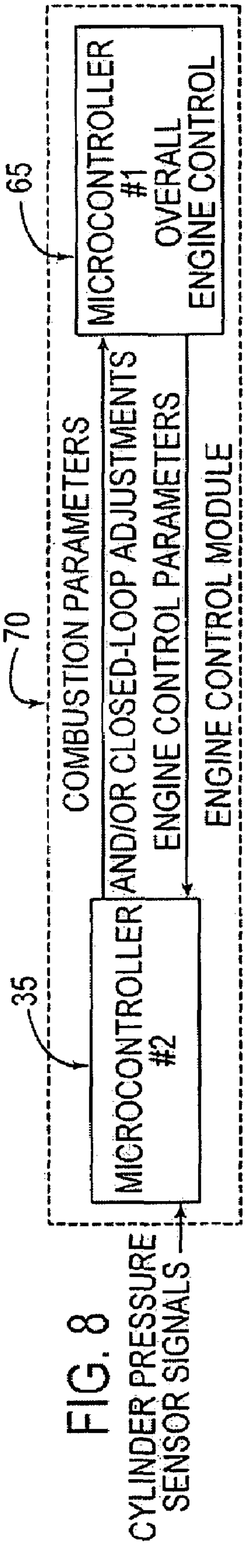
FIG. 8 is a schematic view of an engine control system according to another aspect or embodiment of the present invention.

In the embodiment illustrated in FIG. 8, Microcontrollers 35 and 65 are part of an engine control module (ECM) or fuel injection controller 70. The cylinder pressure sensor signals are received by Microcontroller 35 of ECM/fuel injection controller 70 while Microcontroller 65 manages overall engine control. Microcontroller 35 performs the combustion parameter calculations and optionally closed-loop engine control adjustments. The combustion parameters and/or closed-loop adjustments are communicated from Microcontroller 35 to Microcontroller 65. Cylinder-specific data concerning fuel injection timing, spark timing, and the like may be communicated from Microcontroller 65 to Microcontroller 35 for use in computing closed-loop engine control adjustments.

Figure 9:
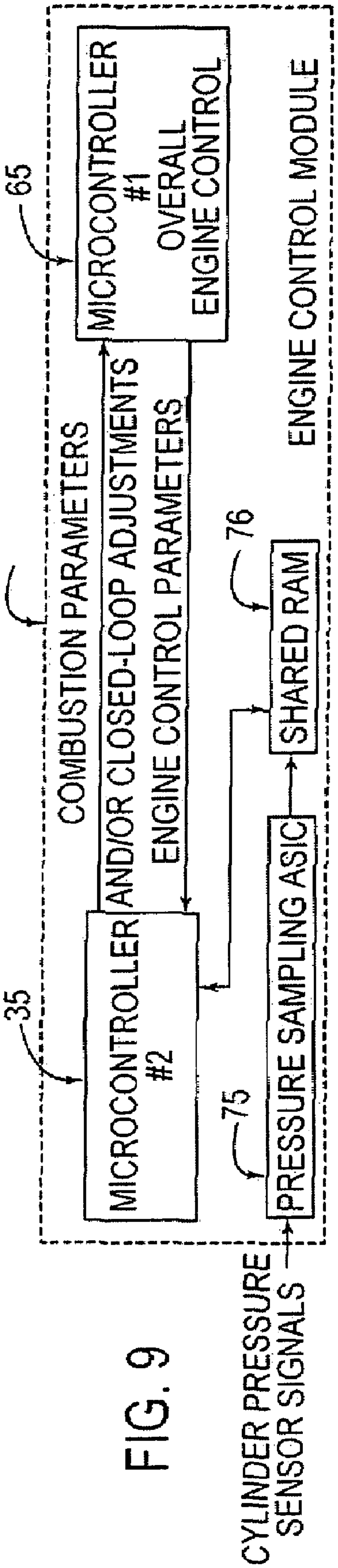
FIG. 9 is a schematic view of an engine control system according to another aspect or embodiment of the present invention.

With further reference to FIG. 9, a control system according to another aspect of the present invention includes an engine control module or fuel injection controller 70 that receives cylinder pressure signals in an Application Specific Integrated Circuit (ASIC) 75. The pressure sampling ASIC 75 is connected to shared RAM 76 which supplies the cylinder pressure data to the Microcontroller 35. The Microcontrollers 35 and 65 are operably interconnected and transfer information in substantially the same manner as described above in connection with FIGS. 7 and 8.

Figure 10:
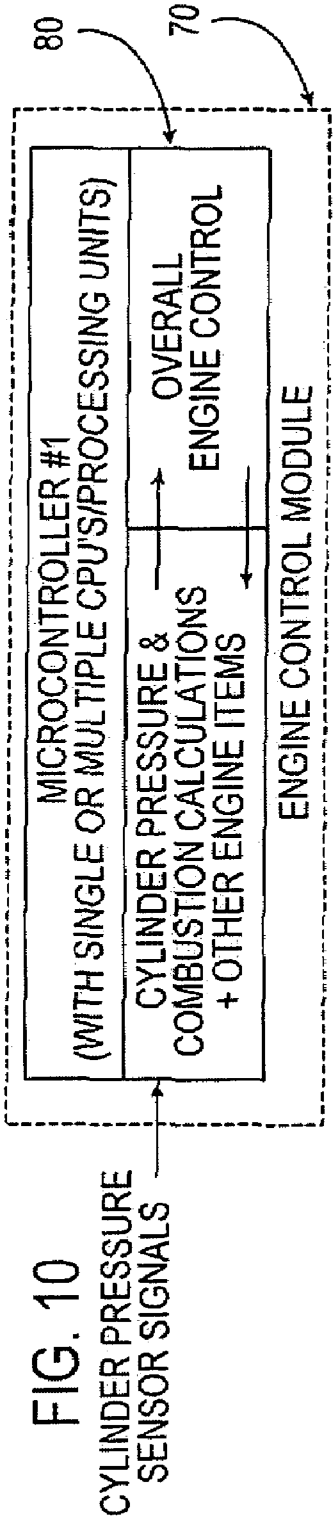
FIG. 10 is a schematic view of an engine control system according to another aspect or embodiment of the present invention.

With further reference to FIG. 10, ECM/fuel injection controller 70 may include a Microcontroller 80. The system shown in FIG. 10 utilizes a single Microcontroller 80 to provide the cylinder pressure and combustion calculations and the overall engine control functions. The cylinder pressure sensor signals may be directly read by the Microcontroller 80, or an ASIC may be utilized as shown in FIG. 9.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. An engine control system utilizing cylinder pressure, comprising:

a plurality of pressure sensors configured to measure cylinder pressures of an internal combustion engine during combustion events and generate analog cylinder pressure data concerning combustion events;

at least one analog-to-digital converter operably connected to the pressure sensors to convert analog cylinder pressure data from the pressure sensors into digital cylinder pressure data;

a plurality of memory buffers, wherein each memory buffer is configured to receive digital cylinder pressure data from the analog-to-digital converter, wherein each memory buffer has sufficient capacity to store digital cylinder pressure data for multiple combustion events of an internal combustion engine;

the control system utilizing the digital cylinder pressure data from the memory buffers to calculate combustion parameters, wherein the digital cylinder pressure data utilized during portions of the engine cycle that are in the vicinity of a combustion event have a first angular resolution, and wherein the digital cylinder pressure data utilized during other portions of the engine cycle has a second angular resolution that is lower than the first angular resolution, the control system providing control of an internal combustion engine based, at least in part, on the calculated combustion parameters.

2. The engine control system of claim 1, wherein:

the analog-to-digital converter is triggered at the first angular resolution during portions of the engine cycle in the vicinity of a combustion event, and at the second angular resolution during other portions of the engine cycle.

3. The engine control system of claim 1, wherein:

the control system controls at least one of a volume of fuel supplied to the cylinders, and timing of an ignition system.

4. The engine control system of claim 1, wherein:

the analog-to-digital converters are triggered at a uniform angular rate throughout an engine cycle, and wherein:

only some of the digital cylinder pressure data from the memory buffers is utilized to calculate the combustion parameters.

5. The engine control system of claim 1, wherein:

the analog-to-digital converters are triggered at smaller angular frequencies during a combustion event than during other portions of an engine cycle.

6. The engine control system of claim 1, wherein:

the control system calculates the combustion parameters for a combustion event for an engine cycle and controls the engine during the next engine cycle utilizing the combustion parameters calculated for the engine cycle immediately prior to the next engine cycle.

7. The engine control system of claim 6, wherein:

the control system sequentially calculates the combustion parameters for each cylinder during an angular window equal to the number of degrees in an engine cycle divided by the number of cylinders of an engine being controlled.

8. The engine control system of claim 1, wherein:

the at least one analog-to-digital converter comprises a plurality of analog-to-digital converters, each being operably connected to a different cylinder pressure sensor.

9. The engine control system of claim 1, wherein:

the control system includes a controller having a timing feature that receives data from an engine crank angle sensor, the controller generating an angle-based signal that controls the analog-to-digital converter at a specified sample rate.

10. The engine control system of claim 9, wherein:

the timing feature receives angular position data from an engine crank angle sensor at a first angular frequency, and generates a signal to the analog-to-digital converter that has a higher frequency than the data from the crank angle sensor.

11. The engine control system of claim 1, including:

a processor configured to calculate the combustion parameters, and wherein:

the system reduces the volume of data utilized to calculate the combustion parameters if the processing demands on the processor exceed an allowable value.

12. The engine control system of claim 11, wherein:

the system decimates data from the cylinder pressure sensors to reduce the number of cylinder pressure data readings utilized to calculate the combustion parameters during portions of the engine cycle that are away from the combustion event, and wherein:

the system adjusts the decimation of data to reduce the volume of data if the processing demands on the processor exceed an allowable value.

13. The engine control system of claim 1, including:

at least one anti-aliasing filter that receives analog cylinder pressure data from the pressure sensors; and wherein:

the anti-aliasing filter is adjusted to change the pass frequency based, at least in part, on engine rpm.

14. The engine control system of claim 13, wherein:

data from the analog-to-digital converters is transferred to the memory buffers via SPI ports of a controller.

15. The engine control system of claim 14, wherein:

data from the SPI ports is transferred to the memory buffers via direct memory access features of a controller.

16. The engine control system of claim 1, including:

a processor running BIOS software;

wherein the memory buffers are interfaced to the BIOS software, and wherein the BIOS software is programmed to decimate the data from the memory buffers to provide digital cylinder pressure-data having relatively high angular resolution during an angular window about combustion events, and relatively low angular resolution during portions of an engine cycle outside the angular window.

17. The engine control system of claim 16, wherein:

the angular resolution within the window can be adjusted.

18. The engine control system of claim 16, wherein:

the size of the angular window can be adjusted.

19. The engine control system of claim 16, wherein:

the angular window defines boundaries that are at least about ninety degrees of crank angle apart.

20. The engine control system of claim 16, wherein:

the angular resolution within the angular window is at least about 0.10°.

21. The engine control system of claim 16, wherein:

the processor is configured to run application software that receives cylinder pressure data from the BIOS software, wherein the application software calculates the combustion parameters.

22. The engine control system of claim 16, wherein:

the angular window comprises a plurality of angular windows having different angular resolutions.

23. The engine control system of claim 22, wherein:

the angular window encompasses a top dead center angular position at which combustion occurs.

24. An engine control system for internal combustion engines having a plurality of cylinders, the control system comprising:

a plurality of pressure sensors configured to measure the cylinder pressure of each cylinder of an internal combustion engine and provide cylinder pressure data;

an on-board controller operably connected to the pressure sensors, wherein the on-board controller is configured to be mounted in a vehicle to provide control during engine operation; and wherein:

the on-board controller utilizes cylinder pressure data from the pressure sensors to calculate at least one combustion parameter for a combustion event occurring during an engine cycle, and wherein the at least one combustion parameter is calculated before another combustion event occurs during the next engine cycle, and the combustion parameter is used to control the next combustion event occurring during the next engine cycle.

25. The engine control system of claim 24, including:

the pressure sensors provide an analog output;

at least one analog-to-digital converter operably connected to the pressure sensors;

a timing control feature that actuates the analog-to-digital converter to provide a plurality of digital pressure readings.

26. The engine control system of claim 24, wherein:

the cylinder pressure data from the pressure sensors is in analog form; and including:

an anti-aliasing filter that filters the analog cylinder pressure data, and wherein the cut-off frequency of the anti-aliasing filter is adjusted as a function of engine rpm.

27. The engine control system of claim 24, including:

a sensor configured to measure an angular position of a rotating engine component and wherein:

the timing control feature actuates the analog-to-analog converter at selected angular positions of the rotating engine component.

28. The engine control system of claim 27, wherein:

the sensor measures the angular position at a first angular resolution; and the timing control feature actuates the analog-to-digital converter at a second angular resolution that is substantially greater than the first angular resolution.

29. The engine control system of claim 24, wherein:

the engine control system includes at least one memory buffer associated with each pressure sensor;

the cylinder pressure data from each pressure sensor is digitized and stored in a memory buffer associated with each pressure sensor.

30. The engine control system of claim 29, wherein:

the digitized cylinder pressure data is supplied to the memory buffers via SPI ports of a controller and direct memory access features of a controller.

31. A closed-loop engine control system utilizing measured cylinder pressure to control engine input affecting combustion in a four-cycle internal combustion engine, the control system comprising:

a plurality of pressure sensors configured to measure cylinder pressures of an internal combustion engine during combustion events and generate cylinder pressure data concerning combustion events;

a fuel injection system configured to provide fuel to the cylinders of an internal combustion engine;

wherein the control system utilizes the cylinder pressure data to calculate combustion parameters, and provides control of at least one of a volume of fuel supplied to a cylinder and the timing of the fuel supplied to a cylinder of an internal combustion engine by the fuel injection system based, at least in part, on the combustion parameters.

32. The closed-loop engine control system of claim 31, wherein:

the control system utilizes combustion parameters from a cycle of a cylinder to control at least one of a volume of fuel and timing of fuel supplied to the cylinder during the next cycle of the cylinder.

33. The closed-loop engine control system of claim 31, wherein:

the cylinder pressure data generated by the pressure sensors is in analog form.

34. The closed-loop engine control system of claim 33, wherein:

the control system converts the cylinder pressure data to a digital form; and including:

a controller programmed to calculate the combustion parameters utilizing the digitized cylinder pressure data.

* * * * *